Oct. 19, 1943.   J. FUEST, JR   2,331,902
MEANS FOR CUTTING PRINT BUTTER
Filed Dec. 13, 1940
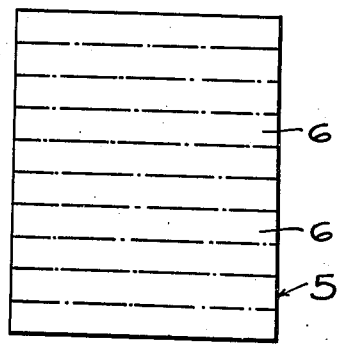
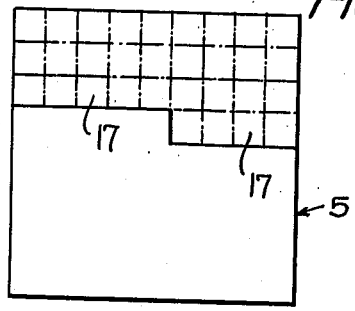
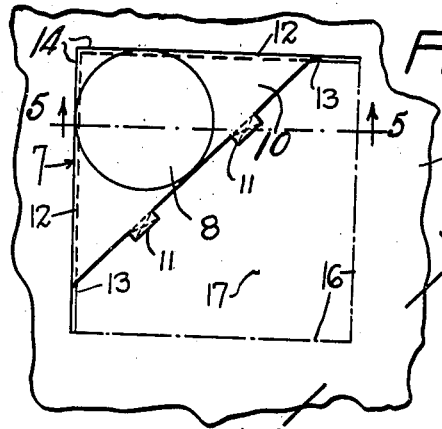
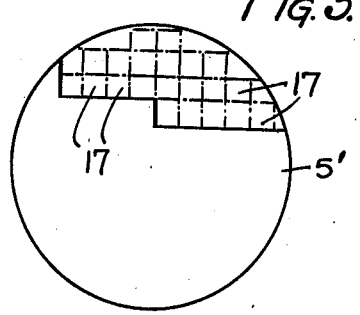
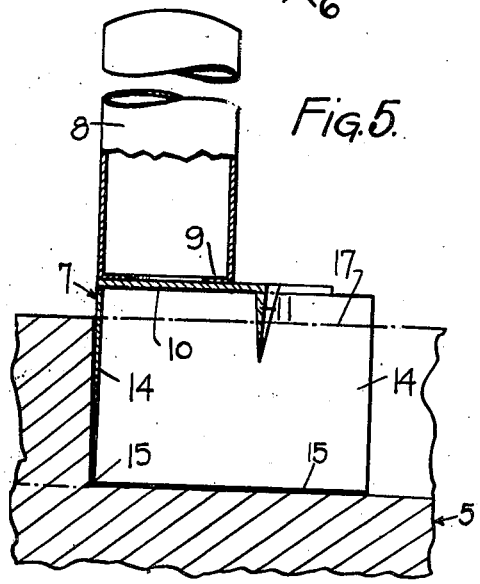
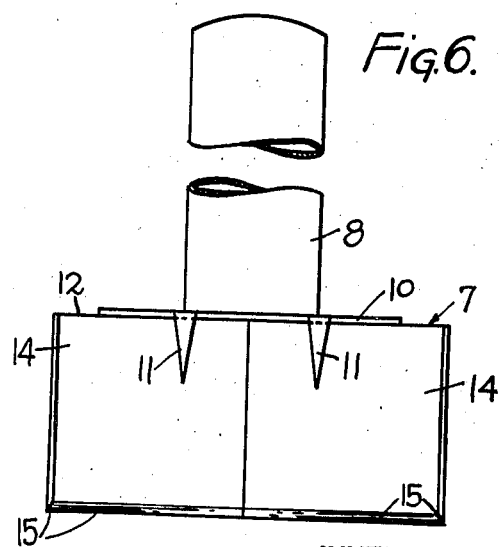
INVENTOR
John Fuest, Jr.

Patented Oct. 19, 1943

2,331,902

UNITED STATES PATENT OFFICE 2,331,902

MEANS FOR CUTTING PRINT BUTTER

John Fuest, Jr., Glendale, N. Y.

Application December 13, 1940, Serial No. 370,054

1 Claim. (Cl. 30—124)

This invention relates to a means for cutting print butter and has for its principal object the elimination of weighing and cutting at random from a tub of butter an amount to be dispensed, as is the practice at the present time. The dispensing of butter today, or other material that is sent to the retailer in the shape of a mass, requires the cutting and trying of a certain measurement on a scale, which consumes time and results in the customer being either overcharged or undercharged, due to the inability of the storekeeper to cut from a tub or other container a print or section of the material that will be exact in weight.

I contemplate the cutting of a tub of butter of either rectangular or cylindrical formation into a plurality of layers of predetermined thickness, after which a novel tool or implement to be herein described is employed to cut from the layers so formed blocks or prints of butter or the like of predetermined weight.

In this manner, weighing is eliminated, the butter is cut squarely and neatly and the proper weight is given the customer.

Changes and variations may be made in the construction shown and described without departing from the principles of the invention or sacrificing its chief advantages; hence such invention is not to be confined to the structures shown in the accompanying drawing.

Figure 1 is a view in elevation of a mass of butter or the like which is divided into layers of equal thickness from top to bottom, as indicated by dot and dash lines.

Figure 2 is a top plan view of a rectangular shaped mass of butter or the like, as illustrated in Fig. 1, which has been cut prints or blocks of butter of predetermined weight, as indicated by dot and dash lines.

Figure 3 is a top plan view of a cylindrical mass from which have been cut blocks or prints of the substance.

Figure 4 is a top plan view of an implement or tool employed in the cutting out of the prints or blocks of butter from the layers, the implement having two cutting blades disposed at right angles to each other so that when the tool is operated in two different positions, a rectangular piece of the mass is removed from the layer.

Figure 5 is a view in vertical section taken on line 5—5 of Fig. 4 through the implement showing the construction thereof; and Figure 6 is a view in elevation looking in the direction of the arrows 6—6 of Figure 4 and illustrating the tool including the blades and the print lifting prongs employed as a part of my invention.

Referring to the drawing in detail, 5 indicates a mass of butter or the like which is ordinarily shipped to the retailer in tubs and from which pieces are cut and weighed to be dispensed in quarter, half, three-quarters or full pound weights. The drawing illustrates two different shapes of butter masses, but while the conventional shape is cylindrical mass, as illustrated in Figure 3, I may form the mass in any shape to more perfectly carry out the object of my invention.

Before the butter is packed, and as a first step in the method of preparing the print butter, the mass is cut, as at 6, in layers, which for the purpose of illustration may be one and three-sixteenths inches deep, although any measurement may be employed, and after the layers are formed, which operation is performed by drawing a wire cutter through the mass as to define the layers, the butter is placed back into the container in which it is to be shipped and sent to the retailer. The retailer is provided with the tool 7 which consists of a handle 8 of tubular formation which is soldered or otherwise secured as at 9 to the cross piece or shelf 10. This cross piece 10 is provided with downwardly extending prongs 11 along its forward edge and at its outer side edges 12 is soldered or otherwise connected to the upper edges 13 of the blades 14. These blades 14 are sharpened on their lower edges as at 15 so that their entrance into the mass is facilitated.

When it is desired to remove, for instance, a quarter of a pound of butter in print form, the tool is placed in the position illustrated in Figures 4 and 5 on top of the uppermost layer 6 of the butter or other material and the layer is cut through, as illustrated in Figure 5, then the tool is withdrawn and the cut made as indicated by the dot and dash lines 16, so that a block of rectangular formation is cut out of the layer 6. When the tool has been forced downwardly through the layer to the next adjacent layer, the prongs 11 will engage the upper surface of the block that has been cut out, and on the last cut will, because the block has been entirely cut away from the layer, lift up the print 17, which may be immediately wrapped without weighing because the dimensions of the tool are such that when the cutting operation is completed, a block of butter or similar material two and five-eighths inches square by one and three-sixteenth inches deep is removed which weighs exactly one-quarter of a pound. The cutting is neat and sharp and the mass or print removed is exactly the right weight and consequently the weighing of the butter removed is unnecessary. This saves time, and the print 17 that has been removed, being of rectangular formation, can be immediately wrapped in wax paper without the necessity of putting it into the paper butter tray, which was heretofore employed when the butter was cut out of the tub in small pieces in order to obtain the desired weight.

If desired, the blades 14 of the tool may be of such width that they will cut down through one, two, three or four layers in order that a pound of butter may be removed at one time, or, the tool may be of such dimensions that a larger rectangle of butter may be removed, that is, for instance, a full half pound or three-quarters, or full pound may be removed with a single cut of the proper implement.

While my invention may be employed in connection with cylindrical masses of butter, as sold in tubs, in order to save time and waste in the selling of the butter, it is preferably adapted for use in connection with a rectangular mass of butter in which an even number of prints may be taken from each layer without any pieces being left over as is necessary in the cylindrical mass.

It is evident, therefore, that I have provided a means of producing or cutting print butter which not only saves time by eliminating weighing, but provides for the dispensing of the unwrapped print in retail trade in measurements of one half, three quarters and full pound.

My invention is not to be restricted to the precise details of construction shown since various changes and modifications may be made therein without departing from the scope of the invention or sacrificing the advantages derived from its use.

What I claim is:

A single tool for use in two positions in cutting blocks of rectangular formation from a mass precut to form horizontal layers, said tool comprising vertically disposed blades positioned at right angles to each other and presenting lower cutting edges, a shelf extending between the top edges of said blades and forming a corner piece at the juncture of said blades, piercing prongs integral with the shelf and depending from the free edge thereof to engage the mass, and a tubular handle attached to said shelf and facilitating the moving of the tool from first to second cutting position.

JOHN FUEST, Jr.